(12) United States Patent
Vinogradov et al.

(10) Patent No.: US 8,777,106 B2
(45) Date of Patent: Jul. 15, 2014

(54) IMAGING READER WITH NON-UNIFORM MAGNIFICATION WITHIN A FIELD OF VIEW

(75) Inventors: Igor Vinogradov, Oakdale, NY (US); Miroslav Trajkovic, Centereach, NY (US)

(73) Assignee: Symbol Technologies, Inc., Holtsville, NY (US)

(*) Notice: Subject to any disclaimer, the term of this patent is extended or adjusted under 35 U.S.C. 154(b) by 461 days.

(21) Appl. No.: 13/167,150

(22) Filed: Jun. 23, 2011

(65) Prior Publication Data

US 2012/0325909 A1   Dec. 27, 2012

(51) Int. Cl.
*G06K 7/10*   (2006.01)

(52) U.S. Cl.
USPC ............................................. 235/454

(58) Field of Classification Search
CPC ...... G02B 27/62; G02B 21/32; G02B 6/3578; F41H 13/0068; B23Q 1/36; G02C 2202/08; G02C 2202/22; G02C 7/028; G02C 7/042; G02C 7/044; G03F 7/70691; G03F 9/7023; G03F 9/7049; H04L 25/03242
USPC ....................................................... 235/454
See application file for complete search history.

(56) References Cited

U.S. PATENT DOCUMENTS

| 5,814,803 A * | 9/1998 | Olmstead et al. ........ 235/462.01 |
| 5,834,749 A | 11/1998 | Durbin |
| 2009/0167884 A1* | 7/2009 | Connell, Jr. ............... 348/222.1 |

OTHER PUBLICATIONS

International Search Report and Written Opinion for International Patent Application No. PCT/US2012/042894 issued on Sep. 10, 2012.

* cited by examiner

*Primary Examiner* — Seung Lee
*Assistant Examiner* — Tae Kim
(74) *Attorney, Agent, or Firm* — Nong-Qiang Fan

(57) ABSTRACT

An imaging lens assembly captures return light through a window of a vertical slot scanner from a target located in a range of working distances along an optical axis away from the window, and projects the captured return light onto an array of a solid-state imager. The imaging lens assembly is optically modified for non-uniform magnification within, and for increasing resolution at an outer peripheral region of, a field of view of the array, in an imaging plane generally perpendicular to the optical axis. The magnification is at least partly increased in the imaging plane with increasing radial distance away from the optical axis, to enable reading of the target when tilted relative to the optical axis and located at the outer peripheral region of the field of view.

16 Claims, 4 Drawing Sheets

IMAGING READER WITH NON-UNIFORM MAGNIFICATION WITHIN A FIELD OF VIEW

BACKGROUND OF THE INVENTION

Solid-state imaging readers have been installed in slot scanners or workstations having a horizontally and/or a generally vertically arranged window in supermarkets, warehouse clubs, department stores, and other kinds of retailers for many years, to electro-optically read symbol targets, such as one-dimensional and two-dimensional symbols, particularly a Universal Product Code (UPC) bar code symbol, and non-symbol targets, such as driver's licenses, receipts, signatures, etc., the targets being associated with products to be processed by the slot scanners. An operator or a customer may slide or swipe a product associated with a target in a moving direction across and past a window of the slot scanner in a "swipe" mode. Alternatively, the operator or the customer may momentarily present the target associated with the product to an approximate central region of the window in a "presentation" mode. The choice depends on user preference or on the layout of a workstation in which the system is used.

The reader includes an imager having a one- or two-dimensional array of sensors (also known as pixels), which correspond to image elements or pixels in a field of view (FOV) of the array. Such an imager may include a one- or two-dimensional charge coupled device (CCD) or a complementary metal oxide semiconductor (CMOS) device, and is analogous to the imager used in a digital consumer camera to capture images. The reader includes an illumination system for illuminating the target with illumination light emitted from a light source and directed through the window to the target for reflection and scattering therefrom, as well as an imaging lens assembly having an optical axis for capturing return light from the target through the window, and for projecting the captured return light as an image onto the array. Electronic circuitry, including a controller or programmed microprocessor, processes electrical signals generated by the array and indicative of the captured image. If the target is a symbol, then the controller also decodes the captured image and thus reads the symbol. If the target is not a symbol, then the controller processes, for example, stores, optically corrects, and/or displays, the captured image.

The position and orientation of the target relative to the window are variable. The target may be located low or high, or right to left, on the product, or anywhere in between, or on any of the sides of a box-shaped product. The target may be oriented in a "picket fence" orientation in which the elongated parallel bars of the one-dimensional UPC symbol are vertical, or in a "ladder" orientation in which the symbol bars are horizontal, or at any orientation angle in between. The target may be movable or held momentarily steady relative to the window. The target may be located on, near, or remote from, the optical axis of the imaging lens assembly, and may be located anywhere either inside or outside of the FOV of the array, and may be located anywhere inside or outside a range of working distances along the optical axis away from the window.

It is desirable to have the FOV of the array relatively large at a near working distance or a close proximity to the window of the workstation so that the FOV covers the entire target. At farther working distances, it is preferred to have the FOV diverge slowly. As advantageous as the use of the solid-state reader is, the range of working distances or ability to read targets by the reader is limited by the optical characteristics of the imaging lens assembly and by the number of pixels in, or resolution of, the imager array. A ratio between the smallest imaged bar/space area, or module, of a target bar code symbol to the number of pixels on which the bar/space area is projected onto the imager array, that is, the number of pixels covered by the bar/space area, is known as "pixels per module" or PPM. When the FOV diverges rapidly, the PPM decreases rapidly too, which, in some cases, limits the capability of the reader to decode and read target symbols at far working distances.

In cases when the target symbol is tilted in a particular direction at a substantial imaging angle, for example, 45 degrees or more, relative to the optical axis of the imaging lens assembly described above, and when the target symbol is located at outer peripheral edge regions of the FOV radially remote from the optical axis, the PPM is further reduced as a function of the cosine of the imaging angle due to the projection effect. Also, the tilted symbol appears to look denser than it actually is. A projected image of the tilted symbol on the array has a higher density than the image of a symbol oriented in a plane generally perpendicular to the optical axis of the imaging lens assembly. It is desirable to increase the PPM along the particular direction of the tilted target symbol to compensate for the loss of the PPM, the reduced resolution, the apparent increased density, and the decreased capability to decode and read such tilted symbols located in such radially remote outer peripheral edge regions of the FOV.

SUMMARY OF THE INVENTION

This invention relates to a reader for, and a method of, electro-optically reading a target by image capture. The target is preferably a symbol. The reader includes a housing having a window. Preferably, the reader is a vertical slot scanner whose window lies in an upright plane. The reader could also be a dual window workstation having one window lying in a substantially upright plane as described above, as well as another window lying in a generally horizontal plane. A solid-state imager is supported by the housing, and preferably within the housing behind the window. The imager has an array of sensors with a field of view in which the target is located during reading. The array comprises a one- or two-dimensional, charge coupled device (CCD) array or a complementary metal oxide semiconductor (CMOS) array, of submegapixel or supermegapixel size.

An illumination system illuminates the target through the window with illumination light from light sources, e.g., light emitting diodes (LEDs). An imaging lens assembly having an optical axis is operative for capturing return illumination light through the window from the target located in a range of working distances along the optical axis away from the window, and for projecting the captured return illumination light onto the array. A controller or programmed microprocessor is operative for controlling the illumination system to illuminate the target, for controlling the imager to capture the illumination light returning from the target over an exposure time period to produce electrical signals indicative of the target being read, and for processing the electrical signals to read the target, especially to decode a target symbol.

In accordance with one aspect of this invention, the imaging lens assembly is optically modified for non-uniform magnification within, and for increasing resolution at an outer peripheral region of, the field of view of the array, in an imaging plane generally perpendicular to the optical axis. The magnification at least partly increases in the imaging plane with increasing radial distance away from the optical axis, to enable reading of the target when tilted relative to the optical axis and located at the outer peripheral region of the field of view. Thus, as the magnification is increased in the outer peripheral region in the imaging plane, then there will be more pixels in a given area for sampling the target, a higher PPM, and, as a result, the resolution of the array will be increased along the radial direction in that outer peripheral region. The non-uniform magnification improves the resolution, especially in those cases where the target being read is imaged at a steep, oblique angle relative to the optical axis. Non-uniform magnification partially compensates for any loss in imager array resolution due to the projection effect caused by such a steep, oblique angle and enables the reader to successfully read such tilted targets in the outer peripheral region.

In a preferred embodiment, the optically modified imaging lens assembly comprises non-rotationally symmetrical optics, which advantageously include at least one of a toroidal lens, a cylindrical lens, an aspherical toroidal lens, and an aspherical cylindrical lens. Such optics create the desired non-uniform magnification preferably only in a horizontal plane along which the target is moved in a moving direction across the horizontal FOV and past the window. The optically modified imaging lens assembly could also comprise rotationally symmetrical optics.

Advantageously, the optically modified imaging lens assembly gradually increases the magnification in the imaging plane with increasing radial distance away from the optical axis. Put another way, the effective focal length of the imaging lens assembly on the optical axis is shorter than its effective focal length off the optical axis at the outer peripheral region. A longer focal length increases the magnification of the imaging lens assembly. This invention thus redistributes the magnification from an on-axis region to an off-axis region at the outer periphery of the field of view, to enable tilted target symbols at the outer peripheral region to be successfully decoded and read.

In another modification, the optically modified imaging lens assembly gradually increases the magnification, i.e., increases the effective focal length, in the imaging plane with increasing radial distance away from the optical axis until the outer peripheral region of the field of view is reached, and then gradually decreases the magnification, i.e., decreases the effective focal length, in the imaging plane with increasing radial distance away from the optical axis as the outer peripheral region of the field of view is traversed, to partially compensate for the greater working distance from the window of one end of the tilted target symbol relative to an opposite end of the tilted target symbol. Put another way, the end region of the tilted target symbol, which is closer to the imaging lens assembly as considered along the optical axis, requires less magnification for a successful reading as compared to the opposite end region of the tilted target symbol, which is farther from the imaging lens assembly as considered along the optical axis. The farther end region would therefore appear smaller when projected on the imager array and, hence, would benefit from an increase in magnification.

In accordance with another feature of this invention, the method of electro-optically reading indicia by image capture is performed by locating the target in a field of view of an array of sensors of a solid-state imager during reading, capturing return light through a window from the target located in a range of working distances along an optical axis of an imaging lens assembly, projecting the captured return light onto the array, and optically modifying the imaging lens assembly for non-uniformly magnification within, and for increasing resolution at an outer peripheral region of, the field of view of the array, in an imaging plane generally perpendicular to the optical axis of the imaging lens assembly, by at least partly increasing the magnification in the imaging plane with increasing radial distance away from the optical axis, to enable reading of the target when tilted relative to the optical axis and located at the outer peripheral region of the field of view.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
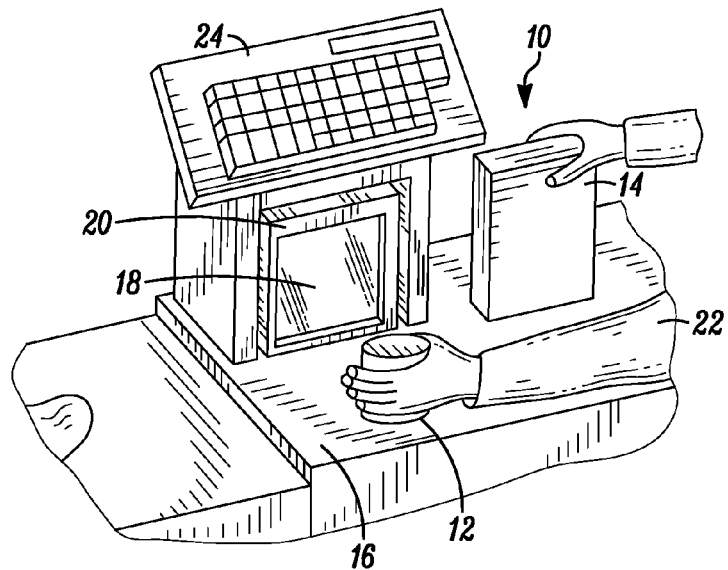
FIG. 1 is a perspective view of an electro-optical reader during use as a vertical slot scanner in accordance with this invention.

Reference numeral 10 in FIG. 1 generally identifies an electro-optical reading workstation for processing transactions at a checkout counter of a retail site at which products, such as a can 12 or a box 14, each associated with, and preferably bearing, a target such as a bar code symbol, are processed for purchase. The counter includes a countertop 16 across which the products are presented or slid at a swipe speed past a generally vertical or upright window 18 of a box-shaped imaging reader 20 configured as a vertical slot scanner mounted on the countertop 16. A user, preferably a checkout operator 22, is located at one side of the countertop 16, and the reader 20 is located at the opposite side. A cash/credit register 24 is located within easy reach of the operator. The reader 20 is portable and lightweight and may be picked up from the countertop 16 by the operator 22, and the window 18 may be aimed at a symbol preferably on a product too heavy or too large to be easily positioned on the countertop 16 in front of the reader 20 in the workstation mode.

Figure 2:
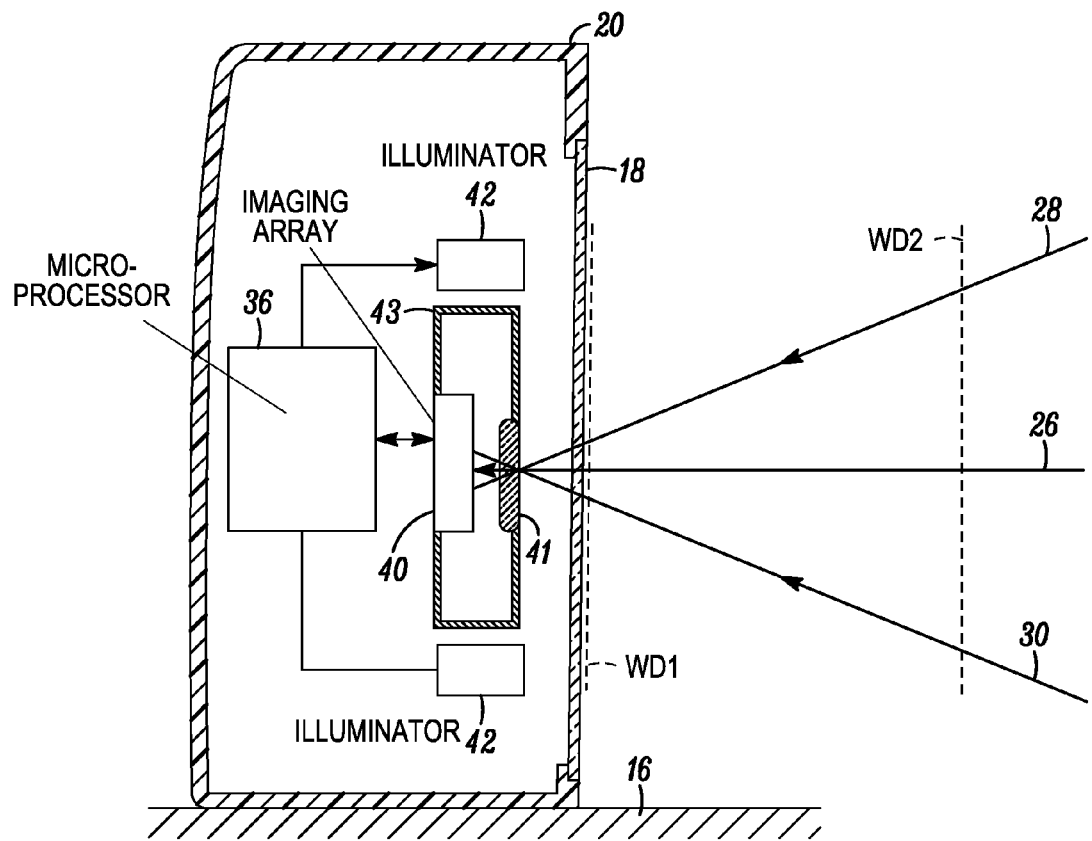
FIG. 2 is a block circuit diagram of various components of the reader of FIG. 1.
Figure 3:
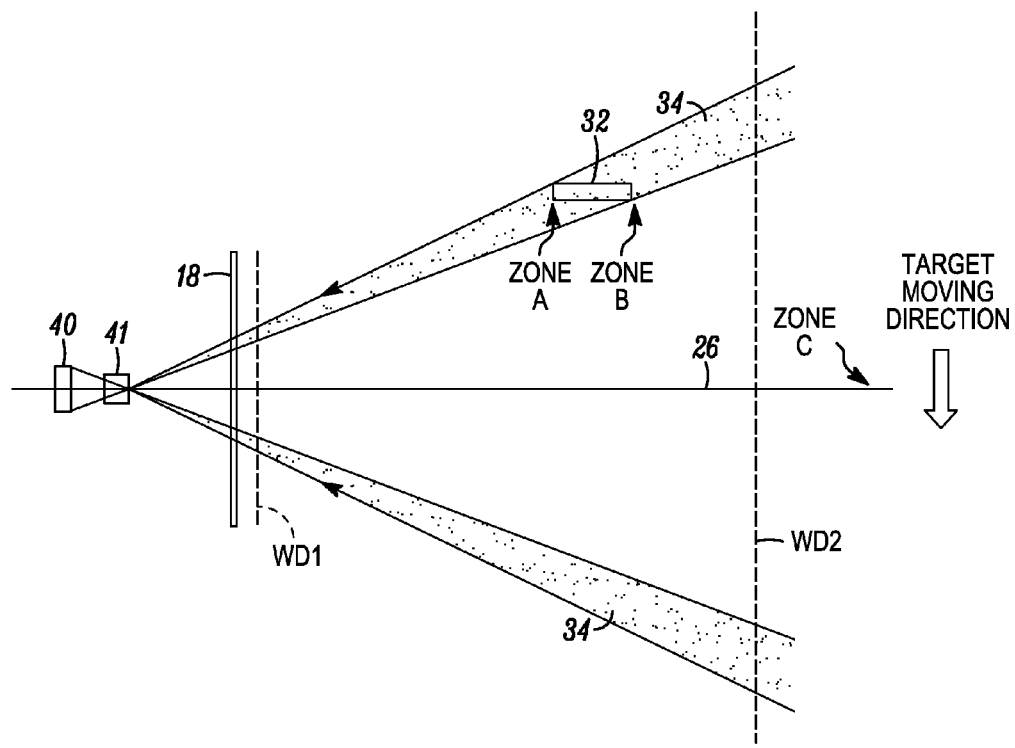
FIG. 3 is a schematic top plan view depicting target movement during operation of the reader of FIG. 1.

The reader 20 includes, as shown in FIG. 2, an imager 40 and an imaging lens assembly 41 that are mounted on a support or holder 43 to comprise an imaging module. The imager 40 is a solid-state device, for example, a CCD or a CMOS imager and has a linear or area array of addressable image sensors or pixels, preferably of submegapixel or supermegapixel size, having a field of view (FOV) that diverges away from the window 18 and is bounded by border lines 28, 30 depicted in FIG. 2. The imaging lens assembly 41 has an optical axis 26 generally perpendicular to the window 18 and is operative for capturing light through the window 18 from a target, for example, a one- or two-dimensional symbol 32 (see FIG. 3), located in a range of working distances along the optical axis 26 between a close-in working distance (WD1) and a far-out working distance (WD2), and for projecting the captured light onto the imager array. The arrow in FIG. 3 depicts the direction along which the target symbol 32 may move across a horizontal FOV and past the window 18 during reading. In a preferred embodiment, WD1 is about two inches from the imager array and generally coincides with the window 18, and WD2 is about eight inches or more from the window 18. An illumination system 42 is also mounted in the reader and preferably includes a plurality of light sources, e.g., light emitting diodes (LEDs) 42, arranged around the imager 40 to uniformly illuminate the target symbol 32 with illumination light.

As shown in FIG. 2, the imager 40 and the illumination system 42 are operatively connected to a controller or programmed microprocessor 36 operative for controlling the operation of these components. Preferably, the microprocessor is the same as the one used for decoding light scattered from the target symbol 32 and for processing the captured target symbol images.

In operation, the microprocessor 36 sends a command signal to the illumination system 42 to pulse the LEDs for a short time period of, for example, 500 microseconds or less, and energizes the imager 40 to collect illumination light reflected and/or scattered from the target symbol 32 substantially only during said time period as the target symbol 32 is moved along the direction of the arrow in FIG. 3. A typical array needs about 16-33 milliseconds to read the entire target image and operates at a frame rate of about 30-60 frames per second.

The imager 40 itself advantageously has a global electronic shutter in which all the sensors are simultaneously exposed for light capture. Most CCD arrays are designed with a global electronic shutter. A typical CMOS array is designed with a rolling electronic shutter in which different sensors are exposed at different times. If a CMOS array is used, then it should be designed to allow a global electronic shutter.

The target symbol 32 may be a one- or a two-dimensional symbol whose use is becoming more widespread, especially in manufacturing environments and in package delivery. Sometimes, the target symbol 32 includes various lengths of truncated symbols of the type frequently found on frequent shopper cards, coupons, loyalty cards, in which case the area imagers can read these additional symbols.

As previously stated, the drawings only depict a schematic representation of a vertical slot scanner 20. Other types of imager-based readers, such as a dual window, bi-optical workstation. Other housings having different shapes, with one or more windows, are also within the spirit of this invention. For example, a stand-alone reader having a gun-shaped housing is another advantageous configuration.

In the prior art, the imaging lens assembly is typically rotationally symmetrical around the optical axis, and the magnification is typically greatest on the optical axis. An imaged target symbol will appear with a different size or density if imaged on the optical axis 26 versus being imaged off the optical axis 26. Although generally satisfactory for capturing on-axis targets, the known imaging lens assemblies are less than satisfactory when, as depicted in FIG. 3, the off-axis target symbol 32 is located at the outer, right and left side, peripheral regions 34 (highlighted with speckles) of the FOV remote from the optical axis 26 and tilted at a substantial imaging angle, for example, 45 degrees or more, relative to the optical axis 26 during its movement along the horizontal FOV along the direction of the arrow in FIG. 3. As discussed above, the PPM is reduced as a function of the cosine of the imaging angle due to the projection effect onto the imager array. Also, the tilted symbol 32 appears to look denser than it actually is. A projected image of the tilted symbol 32 on the imager array has a higher density than the image of a symbol oriented in a plane generally parallel to the window 18 and perpendicular to the optical axis 26.

In order to, among other things, increase the PPM to compensate for the loss of the PPM, the reduced resolution, the apparent increased density, and the decreased capability to decode and read such tilted symbols at the radially remote, outer peripheral regions 34, the imaging lens assembly 41 of this invention is optically modified for non-uniform magnification within, and for increasing resolution at the outer peripheral region of, the field of view, in an imaging plane that extends generally perpendicular to the optical axis 26, and generally perpendicular to the countertop 16.

Figure 5:
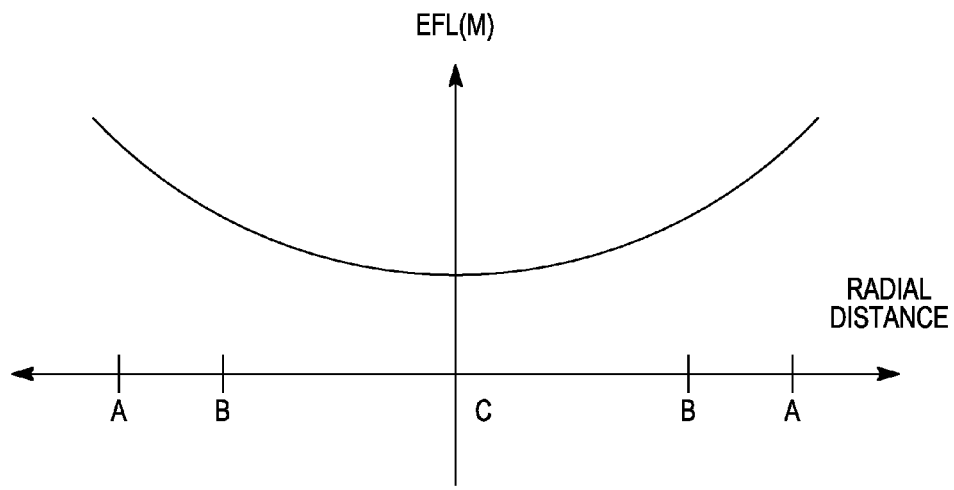
FIG. 5 is a graph depicting how the effective focal length or magnification of the optically modified imaging lens assembly of FIG. 4 is optically modified as a function of radial distance away from an optical axis of the imaging lens assembly in accordance with one embodiment of this invention.

As shown in the graph of FIG. 5 in which the effective focal length (EFL) or magnification (M) is plotted against radial distance away from the optical axis 26, the magnification gradually increases in the imaging plane from a minimum value on the optical axis 26 at zone C (centrally located in the FOV) to a greater magnification at zone B (the radially closer edge of the target 32 in outer region 34 relative to the optical axis 26), to a still greater magnification at zone A (the radially farther edge of the target 32 in outer region 34 relative to the optical axis 26). The increased magnification and resolution in the outer peripheral region 34 comes at the expense of a decrease in the magnification and resolution in the central region (zone C) of the FOV; however, there is still a sufficient amount of magnification and resolution in the central region to adequately read target symbols 32 therein. The non-uniform magnification of this invention thus at least partially compensates for any loss in imager array resolution due to the projection effect caused by imaging the target symbol 32 located in the radially remote outer peripheral region 34 at a steep, oblique angle relative to the optical axis 26.

Figure 4:
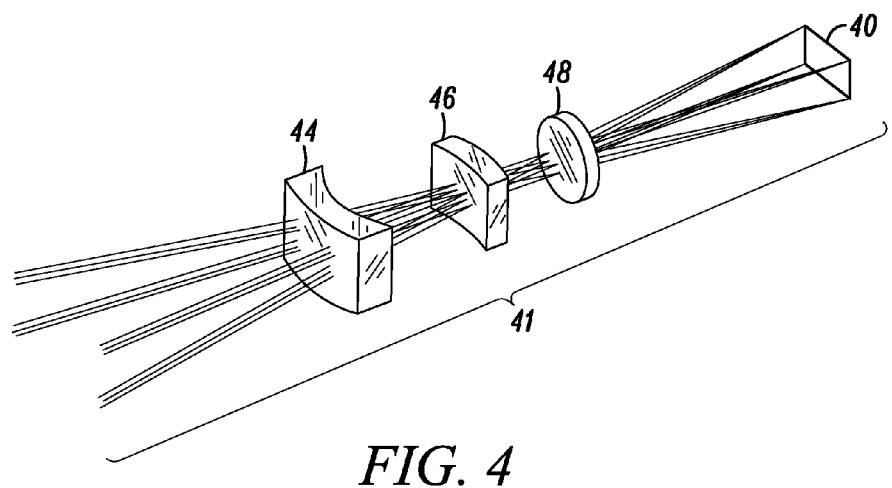
FIG. 4 is a perspective view of an optically modified imaging lens assembly for use with the reader of FIG. 1 in accordance with this invention.

In a preferred embodiment, as shown in FIG. 4, the optically modified imaging lens assembly 41 comprises non-rotationally symmetrical optics for optically modifying the horizontal field of view in the imaging plane. The non-rotationally symmetrical optics advantageously include a first lens 44 configured as an aspherical cylindrical lens with a negative optical power in the horizontal field of view, and a zero optical power in the vertical field of view perpendicular to the horizontal field of view. The second lens 46 is an aspherical cylindrical lens with a positive optical power in the horizontal field of view, and a zero optical power in the vertical field of view. The third lens 48 is a circular focusing lens. Since the optical powers of both lenses 44 and 46 are zero in the vertical field of view, the vertical magnification is not modified. However, since the optical powers of both lenses 44 and 46 are not equal to zero in the horizontal field of view and do not cancel each other out, the magnification of the horizontal field of view is changed. Only the magnification of the horizontal field of view is modified. In other applications, the optical powers of the lenses can be reversed. Toroidal lenses and toroidal aspherical lenses could also be employed to replace the cylindrical or aspherical cylindrical lenses. However, cylindrical shapes are generally easier to fabricate than toroidal shapes. The lenses 44, 46 can be integrated directly into the focusing lens 48 for a more compact design and cost reduction purpose. The optically modified imaging lens assembly could also comprise rotationally symmetrical optics.

As graphically shown in FIG. 5, the optically modified imaging lens assembly 41 gradually increases the magnification, i.e., increases the effective focal length, in the imaging plane with increasing radial distance away from the optical axis 26. Thus, zone A has a greater magnification than zone B which, in turn, has a greater magnification than zone C. Put another way, the effective focal length of the imaging lens assembly 41 on the optical axis 26 is shorter than its effective focal length off the optical axis 26 at the outer peripheral region 34. A longer focal length increases the magnification. Thus, the magnification is redistributed from an on-axis region to an off-axis region at the outer periphery of the field of view, to enable tilted target symbols 32 at the outer peripheral region 34 to be successfully decoded and read.

Figure 6:
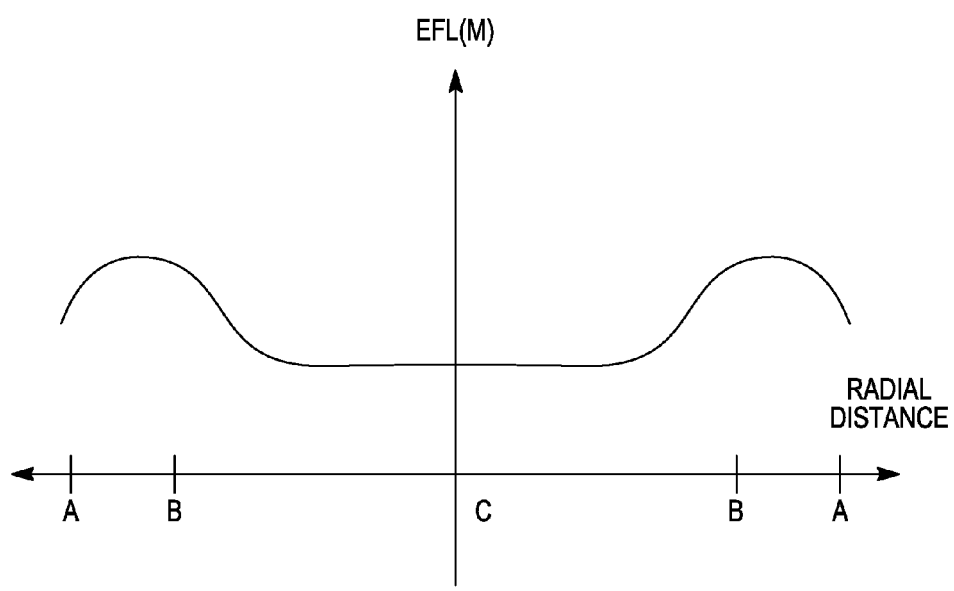
FIG. 6 is a graph depicting how the effective focal length or magnification of the optically modified imaging lens assembly of FIG. 4 is optically modified as a function of radial distance away from an optical axis of the imaging lens assembly in accordance with another embodiment of this invention.

In another modification, as graphically shown in FIG. 6, the optically modified imaging lens assembly 41 gradually increases the magnification, i.e., increases the effective focal length, in the imaging plane with increasing radial distance away from the optical axis 26 from zone C to zone B, but then gradually decreases the magnification, i.e., decreases the effective focal length, in the imaging plane with increasing radial distance away from the optical axis 26 from zone B to zone A to compensate for the greater working distance away from the window 18 of zone B as compared to zone A. Put another way, the end region (i.e., zone A) of the tilted target symbol 32, which is closer to the imaging lens assembly 41 as considered along the optical axis 26, requires less magnification for a successful reading as compared to the opposite end region (i.e., zone B) of the tilted target symbol 32, which is farther from the imaging lens assembly 41 as considered along the optical axis 26. The farther end region (i.e., zone B) would therefore appear smaller when projected on the imager array 40 and, hence, would benefit from an increase in magnification.

Figure 7:
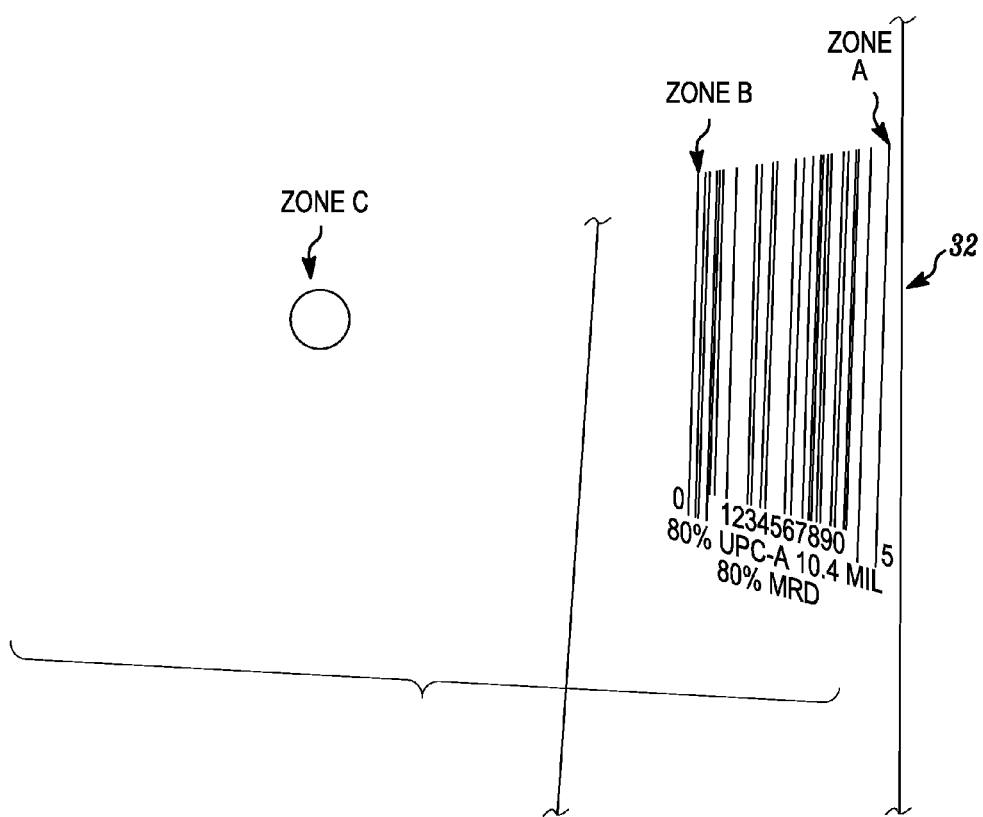
FIG. 7 is an end view looking out into space in a direction perpendicular to the window of the reader of FIG. 1 away from the modified imaging lens assembly along the optical axis and showing a tilted target symbol at an outer peripheral region of the field of view.

FIG. 7 is an end view looking out into space in a direction perpendicular to the window 18 of the reader away from the modified imaging lens assembly 41 along the optical axis 26 and showing the tilted target symbol 32 at the outer peripheral region 34 of the field of view. The closer end region, i.e., zone A, appears larger than the farther end region, i.e., zone B. Hence, as explained above, zone B will benefit from an increase in magnification.

It will be understood that each of the elements described above, or two or more together, also may find a useful application in other types of constructions differing from the types described above.

While the invention has been illustrated and described as embodied in a point-of transaction workstation for electro-optically reading targets by image capture with an imaging lens system optically modified to have non-uniform magnification within a field of view, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A reader for electro-optically reading a target by image capture, comprising:
   a housing having a window;
   a solid-state imager supported by the housing, and having an array of sensors with a field of view in which the target is located during reading;
   an imaging lens assembly having an optical axis, and operative for capturing return light through the window from the target located in a range of working distances along the optical axis away from the window, and for projecting the captured return light onto the array, the imaging lens assembly being optically modified for non-uniform magnification within, and increasing resolution at an outer peripheral region of, the field of view in an imaging plane generally perpendicular to the optical axis, the magnification at least partly increasing in the imaging plane with increasing radial distance away from the optical axis, to enable reading of the target when tilted relative to the optical axis and located at the outer peripheral region of the field of view; and
   wherein the optically modified imaging lens assembly gradually increases the magnification in the imaging plane with increasing radial distance away from the optical axis until the outer peripheral region of the field of view is reached, and then gradually decreases the magnification in the imaging plane with increasing radial distance away from the optical axis as the outer peripheral region of the field of view is traversed.

2. The reader of claim 1, wherein the window is located on the housing in a generally upright plane.

3. The reader of claim 1, wherein the array is one of a charge coupled device (CCD) array and a complementary metal oxide semiconductor (CMOS) array.

4. The reader of claim 1, and further comprising an illumination system supported by the housing, for illuminating the target with illumination light, and wherein the optically modified imaging lens assembly is operative for projecting the captured return illumination light onto the array.

5. The reader of claim 1, and further comprising a controller for processing electrical signals produced by the imager, and for decoding a target symbol.

6. The reader of claim 1, wherein the optically modified imaging lens assembly comprises rotationally symmetrical optics.

7. A reader for electro-optically reading a target by image capture, comprising:
   a housing having a window;
   a solid-state imager supported by the housing, and having an array of sensors with a field of view in which the target is located during reading;
   an imaging lens assembly having an optical axis, and operative for capturing return light through the window from the target located in a range of working distances along the optical axis away from the window, and for projecting the captured return light onto the array, the imaging lens assembly being optically modified for non-uniform magnification within, and increasing resolution at an outer peripheral region of, the field of view in an imaging plane generally perpendicular to the optical axis, the magnification at least partly increasing in the imaging plane with increasing radial distance away from the optical axis, to enable reading of the target when tilted relative to the optical axis and located at the outer peripheral region of the field of view; and wherein the optically modified imaging lens assembly comprises non-rotationally symmetrical optics; and wherein the non-rotationally symmetrical optics include at least one of a toroidal lens, a cylindrical lens, an aspherical toroidal lens and an aspherical cylindrical lens.

8. The reader of claim 7, wherein the optically modified imaging lens assembly gradually increases the magnification in the imaging plane with increasing radial distance away from the optical axis.

9. A method of electro-optically reading a target by image capture, comprising the steps of:

locating the target in a field of view of an array of sensors of a solid-state imager during reading;

capturing return light through a window from the target located in a range of working distances along an optical axis of an imaging lens assembly;

projecting the captured return light onto the array;

optically modifying the imaging lens assembly for non-uniform magnification within, and for increasing resolution at an outer peripheral region of, the field of view, in an imaging plane generally perpendicular to the optical axis, by at least partly increasing the magnification in the imaging plane with increasing radial distance away from the optical axis, to enable reading of the target when tilted relative to the optical axis and located at the outer peripheral region of the field of view; and wherein the optically modifying step is performed by gradually increasing the magnification in the imaging plane with increasing radial distance away from the optical axis until the outer peripheral region of the field of view is reached, and then gradually decreasing the magnification in the imaging plane with increasing radial distance away from the optical axis as the outer peripheral region of the field of view is traversed.

10. The method of claim 9, and orienting the window to lie in a generally upright plane.

11. The method of claim 9, and configuring the array as one of a charge coupled device (CCD) array and a complementary metal oxide semiconductor (CMOS) array.

12. The method of claim 9, and illuminating the target with illumination light, and wherein the projecting step is performed by projecting the captured return illumination light onto the array.

13. The method of claim 9, and processing electrical signals produced by the imager, and decoding a target symbol.

14. The method of claim 9, and configuring the optically modified imaging lens assembly of rotationally symmetrical optics.

15. A method of electro-optically reading a target by image capture, comprising the steps of:

locating the target in a field of view of an array of sensors of a solid-state imager during reading;

capturing return light through a window from the target located in a range of working distances along an optical axis of an imaging lens assembly;

projecting the captured return light onto the array;

optically modifying the imaging lens assembly for non-uniform magnification within, and for increasing resolution at an outer peripheral region of, the field of view, in an imaging plane generally perpendicular to the optical axis, by at least partly increasing the magnification in the imaging plane with increasing radial distance away from the optical axis, to enable reading of the target when tilted relative to the optical axis and located at the outer peripheral region of the field of view;

configuring the optically modified imaging lens assembly of non-rotationally symmetrical optics; and configuring the non-rotationally symmetrical optics as at least one of a toroidal lens, a cylindrical lens, an aspherical toroidal lens, and an aspherical cylindrical lens.

16. The method of claim 15, wherein the optically modifying step is performed by gradually increasing the magnification in the imaging plane with increasing radial distance away from the optical axis.

* * * * *